(12) United States Patent
Aoi et al.

(10) Patent No.: US 12,547,141 B2
(45) Date of Patent: Feb. 10, 2026

(54) INFORMATION PROCESSING APPARATUS, STORAGE MEDIUM, AND RESTORATION SUPPORT METHOD

(71) Applicant: Tokyo Electron Limited, Tokyo (JP)

(72) Inventors: Ryota Aoi, Hokkaido (JP); Yoshitaka Enoki, Iwate (JP); Yasuhiko Okada, Iwate (JP)

(73) Assignee: TOKYO ELECTRON LIMITED, Tokyo (JP)

(*) Notice: Subject to any disclaimer, the term of this patent is extended or adjusted under 35 U.S.C. 154(b) by 375 days.

(21) Appl. No.: 18/118,546

(22) Filed: Mar. 7, 2023

(65) Prior Publication Data

US 2023/0297056 A1 Sep. 21, 2023

(30) Foreign Application Priority Data

Mar. 16, 2022 (JP) ................................. 2022-041027

(51) Int. Cl.
*G05B 19/042* (2006.01)

(52) U.S. Cl.
CPC ............................... *G05B 19/0428* (2013.01)

(58) Field of Classification Search
CPC ................................. G05B 19/02; G05B 15/02
USPC .......................................................... 700/21
See application file for complete search history.

(56) References Cited

U.S. PATENT DOCUMENTS

| 6,162,010 A * | 12/2000 | Ishizawa | H01L 21/67276 414/217 |
| 2003/0149506 A1* | 8/2003 | Haanstra | H01L 21/67276 700/121 |
| 2024/0128100 A1* | 4/2024 | Tsai | G05B 19/418 |

FOREIGN PATENT DOCUMENTS

| CN | 118349423 A * | 7/2024 | G06F 1/30 |
| EP | 0669643 A1 * | 8/1995 | H01L 21/02 |
| JP | 2004-102811 A | 4/2004 | |
| JP | 2006-203145 A | 8/2006 | |
| JP | 2008-204036 A | 9/2008 | |
| JP | 2019-016134 A | 1/2019 | |
| WO | 2013/125387 A1 | 8/2013 | |
| WO | WO-2024081815 A1 * | 4/2024 | G06N 20/00 |

* cited by examiner

*Primary Examiner* — Ronald D Hartman, Jr.
(74) *Attorney, Agent, or Firm* — Venjuris, P.C.

(57) ABSTRACT

An information processing apparatus includes: an operation status data collecting unit that collects operation status data of a plurality of heat treatment apparatuses installed in a manufacturing plant; an operation status data storing unit that stores the operation status data for each of the plurality of heat treatment apparatuses; and an operation status data providing unit that provides list information of the operation status data for each of the plurality of heat treatment apparatuses stored in the operation status data storing unit, as information that supports restoration of the plurality of heat treatment apparatuses when operations of the plurality of heat treatment apparatuses are forcibly stopped.

8 Claims, 7 Drawing Sheets

| APPARATUS NAME | PROCESS TYPE | EXECUTION STATUS | EXECUTION RECIPE NAME | EXECUTION SUB-RECIPE NAME | EXECUTION STEP NAME | ELAPSED TIME OF STEP | DATA COLLECTION RESULT |
|---|---|---|---|---|---|---|---|
| ToolA | ALD-SiN | BEING EXECUTED | main/CLASS_A/DEPO_RECIPE_001 | sub/CLASS_B/DEPO_LOOP | 5 DEPO | 00:12:15 | Success |
| ToolB | ALD-SiN | BEING PAUSED | main/CLASS_A/DEPO_RECIPE_001 | | 4 PRE_DEPO | 00:03:11 | Success |
| ToolC | HCD-SiN | BEING PREPARED FOR PROCESSING | main/CLASS_A/DEPO_RECIPE_001 | | 0 STANDBY | 03:11:55 | Failure |
| ... | ... | ... | ... | ... | ... | ... | ... |

INFORMATION PROCESSING APPARATUS, STORAGE MEDIUM, AND RESTORATION SUPPORT METHOD

CROSS-REFERENCE TO RELATED APPLICATIONS

The present application is based on and claims priority from Japanese Patent Application No. 2022-041027, filed on Mar. 16, 2022, with the Japan Patent Office, the disclosure of which is incorporated herein in its entirety by reference.

TECHNICAL FIELD

The present disclosure relates to an information processing apparatus, a storage medium, and a restoration support method.

BACKGROUND

A remote backup system has conventionally been known, which can keep, for example, backup data up to date every day in response to the occurrence of business data, and enables quick performance of restoration in the event of, for example, data loss caused by an operation mistake, etc. or an occurrence of a disaster (see e.g., Japanese Patent Laid-Open Publication No. 2008-204036).

SUMMARY

In an aspect of the present disclosure, an information processing apparatus includes: an operation status data collecting unit that collects operation status data of a plurality of heat treatment apparatuses installed in a manufacturing plant; an operation status data storing unit that stores the operation status data for each of the plurality of heat treatment apparatuses; and an operation status data providing unit that provides list information of the operation status data for each of the plurality of heat treatment apparatuses stored in the operation status data storing unit, as information that supports restoration of the plurality of heat treatment apparatuses when operations of the plurality of heat treatment apparatuses are forcibly stopped.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawings, which form a part thereof. The illustrative embodiments described in the detailed description, drawings, and claims are not meant to be limiting. Other embodiments may be utilized, and other changes may be made without departing from the spirit or scope of the subject matter presented here.

Hereinafter, embodiments for carrying out the present disclosure will be described with reference to drawings.

<System Configuration>

Figure 1:
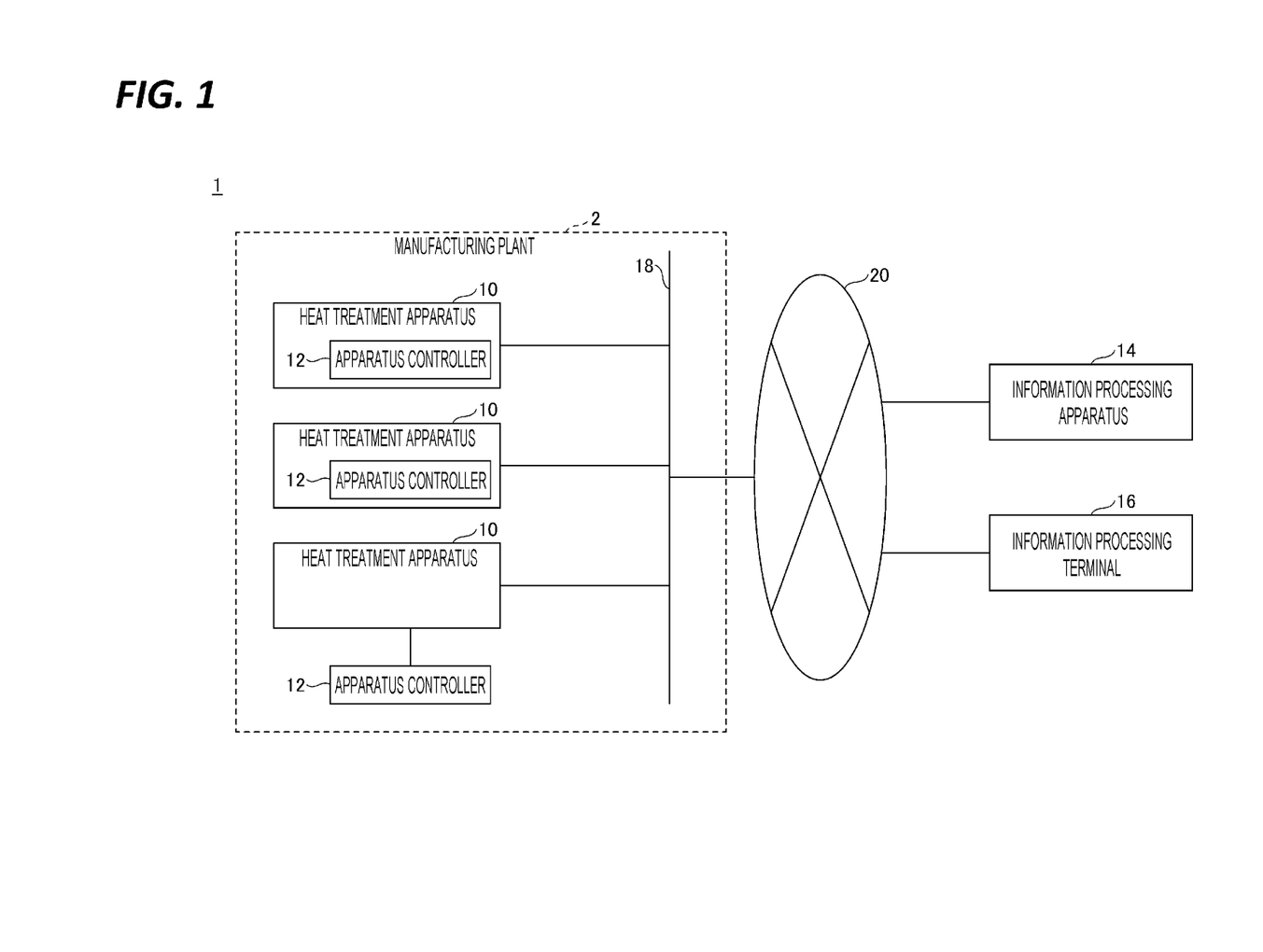
FIG. 1 is a configuration diagram of an example of an information processing system according to the present embodiment.

FIG. 1 is a configuration diagram of an example of an information processing system according to the present embodiment. An information processing system 1 illustrated in FIG. 1 includes heat treatment apparatuses 10 and apparatus controllers 12 installed in a manufacturing plant 2. The information processing system 1 includes an information processing apparatus 14 installed in an environment where an operation is capable of being continued even in the case of an occurrence of a disaster (e.g., earthquake, power failure, etc.), which forcibly stops the heat treatment apparatuses 10 in the manufacturing plant 2. The environment where the information processing apparatus 14 is installed is, for example, a remote location sufficiently far from the manufacturing plant 2.

The information processing system 1 also includes an information processing terminal 16 operated by, for example, an operator who restores the heat treatment apparatuses 10 installed in the manufacturing plant 2, or an administrator who instructs the operator to restore the heat treatment apparatuses 10.

The heat treatment apparatuses 10, the apparatus controllers 12, the information processing apparatus 14, and the information processing terminal 16 are communicatively connected via networks 18 and 20 such as the Internet and a local area network (LAN). The information processing apparatus 14 and the information processing terminal 16 may communicate via the network 20 even when a disaster occurs in the manufacturing plant 2 and the network 18 is unable to be used.

The heat treatment apparatus 10 is, for example, a semiconductor manufacturing apparatus or a film forming apparatus, and accepts a control command according to a recipe, from the apparatus controller 12, and executes processing of the recipe. The degree of progress of the recipe processing is managed by units called steps for control. The degree of progress of the recipe processing is represented by, for example, a step number, or a step name.

As illustrated in FIG. 1, the apparatus controller 12 may be mounted in the heat treatment apparatus 10 or may not be necessarily mounted as long as it is communicatively connected. The apparatus controller 12 is a controller having a computer configuration that controls the heat treatment apparatus 10. The apparatus controller 12 outputs control commands for controlling control components of the heat treatment apparatus 10 according to the recipes.

The apparatus controller 12 has a man-machine interface (MMI) function through which an instruction for the heat treatment apparatus 10 is accepted from the operator, and information on the heat treatment apparatus 10 is provided to the operator.

In usual days when no disaster has occurred, the apparatus controller 12 periodically (e.g., every 10 sec) transmits data representing the operation status of the heat treatment apparatus 10 (operation status data), to the information processing apparatus 14. The operation status data is information including, for example, identification information of the recipe being executed by the heat treatment apparatus 10, identification information of the step indicating the degree of progress of the recipe processing being executed, and execution status information of the step.

When a power failure occurs due to the occurrence of a disaster, the heat treatment apparatus 10 loses power and interrupts the recipe processing being executed. The apparatus controller 12 also loses power and becomes unable to transmit the operation status data of the heat treatment apparatus 10, to the information processing apparatus 14.

In normal days, the information processing apparatus 14 periodically collects the operation status data of the heat treatment apparatus 10 from the apparatus controller 12 of the manufacturing plant 2, and stores the operation status data. The operation status data of the heat treatment apparatus 10 stored by the information processing apparatus 14 is the most recent operation status data of each heat treatment apparatus 10, which is received from the apparatus controller 12.

Therefore, even if a power failure occurs in the manufacturing plant 2 due to the occurrence of a disaster and thus the operation of the heat treatment apparatus 10 is forcibly stopped, the most recent operation status data of the heat treatment apparatus 10, which is received from the apparatus controller 12, is stored in the information processing apparatus 14.

The information processing apparatus 14 may provide list information of the most recent operation status data of the heat treatment apparatuses 10 received from the apparatus controllers 12 prior to the occurrence of a disaster, to the operator or the administrator, as information that supports the restoration of the plurality of heat treatment apparatuses 10 installed in the manufacturing plant 2. The information that supports the restoration of the plurality of heat treatment apparatuses 10 installed in the manufacturing plant 2 may be provided by being displayed on, for example, a display of the information processing apparatus 14, or may be provided by being displayed on, for example, a display of the information processing terminal 16.

In this manner, the operator or the administrator may easily check the processing of the recipes that were being executed by the plurality of heat treatment apparatuses 10 in the manufacturing plant 2 when the disaster has occurred, by referring to the list information of the most recent operation status data of the heat treatment apparatuses 10 received from the apparatus controllers 12 by the information processing apparatus 14 prior to the occurrence of a disaster. Further, the operator or the administrator may easily determine the priority of restoration of the plurality of heat treatment apparatuses 10 whose operations are forcibly stopped due to the occurrence of a disaster, by checking the processing of the recipes that were being executed by the plurality of heat treatment apparatuses 10 in the manufacturing plant 2 when the disaster has occurred.

The information processing system 1 of FIG. 1 is merely an example, and it goes without saying that there are various system configuration examples depending on the applications or purposes. For example, the information processing system 1 may have various configurations, such as a configuration where the apparatus controller 12 for each heat treatment apparatus 10 is integrated in an apparatus controller for the plurality of heat treatment apparatuses 10, or a configuration where the apparatus controller 12 is further divided.

<Hardware Configuration>

Figure 2:
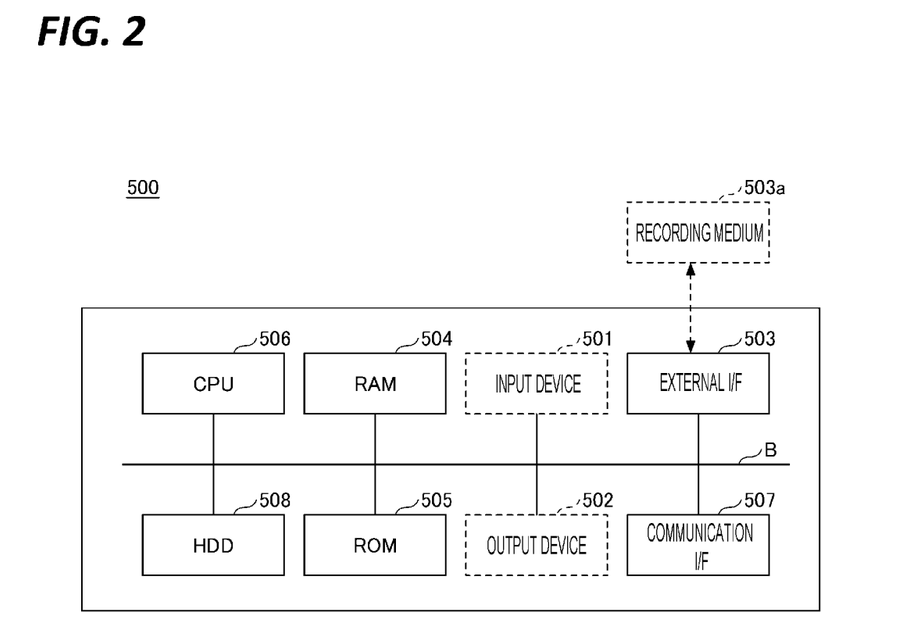
FIG. 2 is a hardware configuration diagram of an example of a computer.

The apparatus controller 12, the information processing apparatus 14, and the information processing terminal 16 of the information processing system 1 illustrated in FIG. 1 are realized by, for example, a computer having a hardware configuration as illustrated in FIG. 2. FIG. 2 is a hardware configuration diagram of an example of a computer.

A computer 500 of FIG. 2 includes an input device 501, an output device 502, an external interface (I/F) 503, a random access memory (RAM) 504, a read only memory (ROM) 505, a central processing unit (CPU) 506, a communication I/F 507, a hard disk drive (HDD) 508, etc., which are individually interconnected via a bus B. In a certain mode, the input device 501 and the output device 502 may be connected in use if necessary.

The input device 501 is, for example, a keyboard, a mouse, or a touch panel, and is used by the operator, etc. to input each operation signal. The output device 502 is, for example, a display, and displays the result of processing by the computer 500. The communication I/F 507 is an interface through which the computer 500 is connected to the network 18 or 20. The HDD 508 is an example of a non-volatile storage device that stores programs or data.

The external I/F 503 is an interface with an external device. The computer 500 may perform reading and/or writing from/to a recording medium 503a such as a secure digital (SD) memory card via the external I/F 503. The ROM 505 is an example of a non-volatile semiconductor memory (storage device) in which programs or data are stored. The RAM 504 is an example of a volatile semiconductor memory (storage device) that temporarily holds programs or data.

The CPU 506 is an arithmetic unit that realizes the overall control or functions of the computer 500 by reading programs or data from the storage device such as the ROM 505 or the HDD 508, on the RAM 504, and executing the processing.

The apparatus controller 12, the information processing apparatus 14, and the information processing terminal 16 in FIG. 1 may implement various functions by, for example, the hardware configuration of the computer 500 in FIG. 2.

<Functional Configuration>

Figure 3:
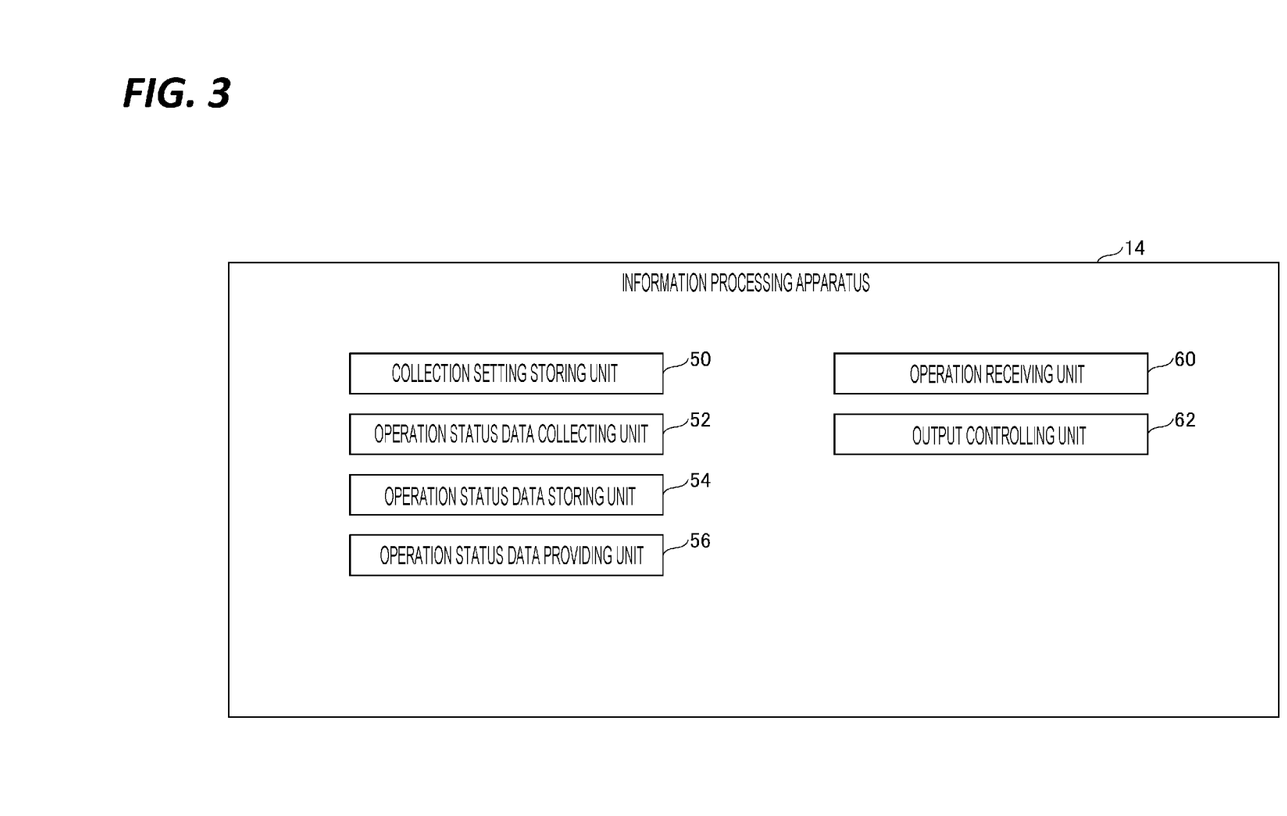
FIG. 3 is a functional block diagram of an example of an information processing apparatus according to the present embodiment.

The information processing apparatus 14 of the information processing system 1 according to the present embodiment is realized by, for example, functional blocks as illustrated in FIG. 3. FIG. 3 is a functional block diagram of an example of the information processing apparatus according to the present embodiment. In the illustration of the functional block diagram of FIG. 3, configurations that are unnecessary for the description of the present embodiment are omitted.

When a program (e.g., restoration support software, etc.) for the information processing apparatus 14 is executed, the information processing apparatus 14 of FIG. 3 realizes a collection setting storing unit 50, an operation status data collecting unit 52, an operation status data storing unit 54, an operation status data providing unit 56, an operation receiving unit 60, and an output controller 62.

The collection setting storing unit 50 stores collection settings necessary for the information processing apparatus 14 to collect the operation status data of the plurality of heat treatment apparatuses 10 installed in the manufacturing plant 2. The collection settings include information such as communication settings for communication with the apparatus controllers 12, and timing settings for collection of operation status data.

The operation status data collecting unit 52 periodically collects the operation status data of the plurality of heat treatment apparatuses 10 installed in the manufacturing plant 2, and stores the operation status data in the operation status data storing unit 54. In the operation status data storing unit 54, the operation status data of the plurality of heat treatment apparatuses 10 installed in the manufacturing plant 2 is periodically stored.

The operation status data providing unit 56 provides list information of operation status data, as information that supports the restoration of the plurality of heat treatment apparatuses 10 of the manufacturing plant 2, to the operator or the administrator who operates the information processing apparatus 14 or the information processing terminal 16.

For example, when a power failure occurs in the manufacturing plant 2 due to the occurrence of a disaster, and the operations of the heat treatment apparatuses 10 are forcibly stopped, the operator or the administrator may display list information on the operation status data of the plurality of heat treatment apparatuses 10 of the manufacturing plant 2, on the information processing apparatus 14 or the information processing terminal 16. The operator or the administrator does not need to approach and check the plurality of heat treatment apparatuses 10 in the manufacturing plant 2 in order to check the processing of the recipes that were being executed when the disaster has occurred.

The operator or the administrator may check the recipe processing that was being executed by each heat treatment apparatus 10 when the disaster has occurred, and determine the priority of restoration of each heat treatment apparatus 10, by referring to the list information of the operation status data of the plurality of heat treatment apparatuses 10 of the manufacturing plant 2, the list information being displayed on the information processing apparatus 14 or the information processing terminal 16.

The operation receiving unit 60 accepts an operation from a user such as an operator or an administrator. The output controller 62 displays and outputs information, on, for example, the display of the information processing apparatus 14 or the information processing terminal 16 according to the operation received from the user such as the operator or the administrator. The output controller 62 may output the information via an e-mail or may print out the information.

For example, the output controller 62 displays and outputs the list information of the most recent operation status data of the heat treatment apparatuses 10 received from the apparatus controllers 12 prior to the occurrence of a disaster, on, for example, the display of the information processing apparatus 14 or the information processing terminal 16.

<Processing>

Figure 4:
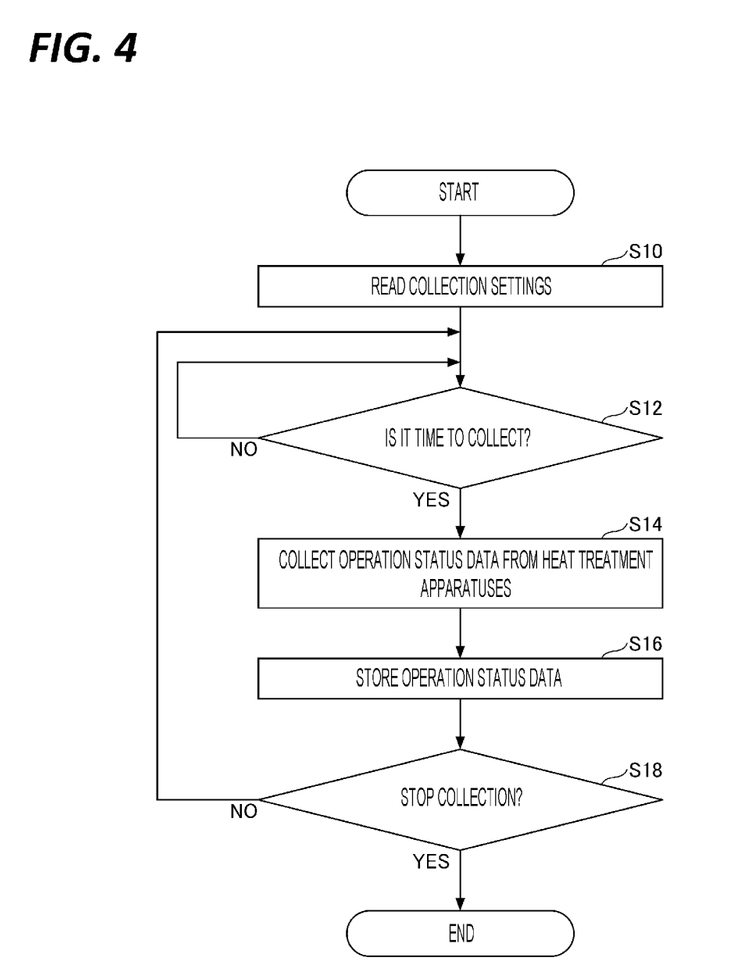
FIG. 4 is a flow chart of an example of processing of the information processing apparatus according to the present embodiment.

In usual days when no disaster has occurred, the information processing apparatus 14 executes processing according to the procedure illustrated in FIG. 4. FIG. 4 is a flow chart of an example of processing of the information processing apparatus according to the present embodiment. It is assumed that the heat treatment apparatuses 10 of the manufacturing plant 2 accept control commands from the apparatus controllers 12, respectively, according to recipes, and asynchronously execute processing (process) of the recipes.

In step S10, the operation status data collecting unit 52 of the information processing apparatus 14 reads collection settings from the collection setting storing unit 50. In step S12, the operation status data collecting unit 52 determines whether it is time to collect operation status data based on timing settings for collection of operation status data, the timing settings being included in the read collection settings.

The operation status data collecting unit 52 repeats the processing of step S12 until it is determined that it is time to collect operation status data. When it is determined that it is time to collect operation status data, the operation status data collecting unit 52 performs the processing of step S14.

In step S14, the operation status data collecting unit 52 collects the operation status data of the plurality of heat treatment apparatuses 10 installed in the manufacturing plant 2 according to the collection settings. The collected operation status data of the plurality of heat treatment apparatuses 10 is stored in the operation status data storing unit 54 in step S16.

Figure 5:
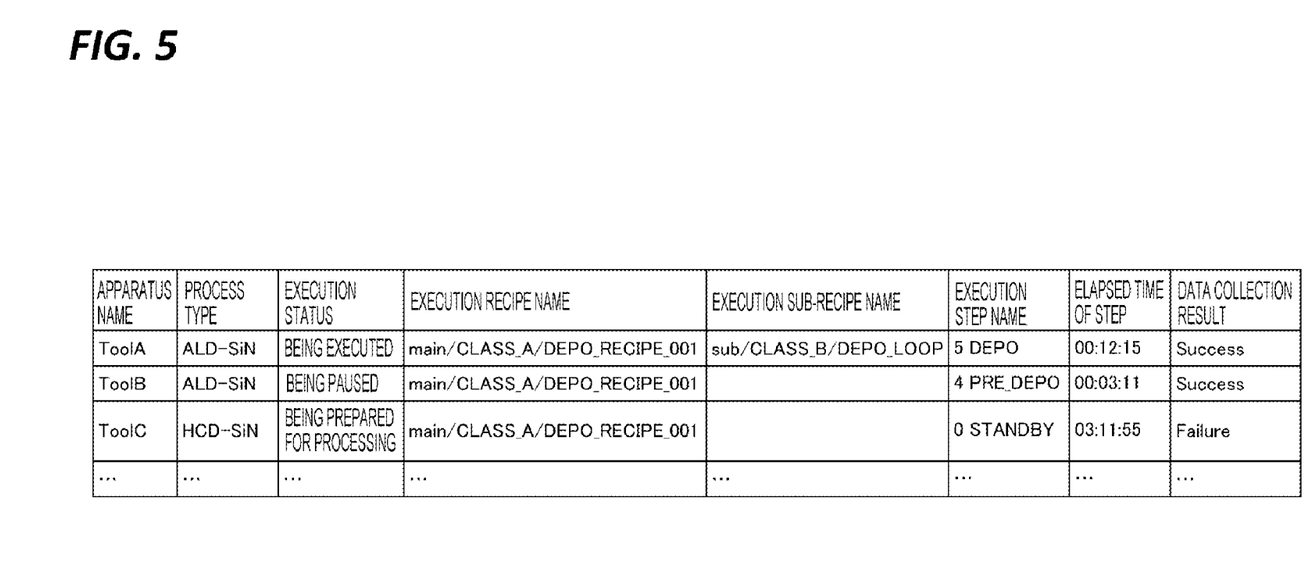
FIG. 5 is a configuration diagram of an example of operation status data according to the present embodiment.

The operation status data of the plurality of heat treatment apparatuses 10, which is stored in the operation status data storing unit 54, is configured as illustrated in, for example, FIG. 5. FIG. 5 is a configuration diagram of an example of operation status data according to the present embodiment. The operation status data of FIG. 5 includes, as items, a device name, a process type, an execution status, an execution recipe name, an execution sub-recipe name, an execution step name, an elapsed time of a step, and a data collection result.

The device name is an example of identification information of the heat treatment apparatus 10, and is, for example, a name of the heat treatment apparatus 10. The process type indicates the type of the process executed by the heat treatment apparatus 10. The execution status is an example of execution status information of a step, and indicates an execution status, such as being executed, being paused, and being prepared for processing. The execution recipe name is an example of identification information of a recipe being executed, and is, for example, a name of the recipe being executed. The execution sub-recipe name is an example of identification information of a sub-recipe being executed, and is, for example, a name of the sub-recipe being executed. The execution step name is an example of identification information of a step being executed, and is, for example, a step number or a step name of the step being executed. The elapsed time of the step indicates the elapsed time after the start of a step. The data collection result indicates success or failure of data collection.

The operation status data may further include, as items, date and time of data collection, date and time of recipe start, step start time, a heater temperature, or a boat elevator location, but minimum required items necessary for determining the priority of restoration are preferred in order to reduce the network load.

In step S18, the operation status data collecting unit 52 determines whether to stop the collection of the operation status data. The operation status data collecting unit 52 repeats the processing of steps S12 to S18 until it is determined to stop the collection of the operation status data. When it is determined to stop the collection of the operation status data, the operation status data collecting unit 52 ends the processing of the flow chart of FIG. 4.

According to the processing of the flow chart in FIG. 4, in usual days when no disaster has occurred, the information processing apparatus 14 may periodically collect and store the operation status data of the plurality of heat treatment apparatuses 10 of the manufacturing plant 2, which is illustrated in, for example, FIG. 5.

For example, it is assumed that a power failure occurs in the manufacturing plant 2 due to the occurrence of a disaster, and the operations of the plurality of heat treatment apparatuses 10 of the manufacturing plant 2 are forcibly stopped. In the information processing apparatus 14, the most recent operation status data of the plurality of heat treatment apparatuses 10 whose operations are forcibly stopped is stored as illustrated in, for example, FIG. 5.

Since the environment where the information processing apparatus 14 is installed is, for example, a remote location sufficiently far from the manufacturing plant 2, it is assumed that the information processing apparatus 14 and the information processing terminal 16 are not affected by a power failure, etc. The information processing apparatus 14 and the information processing terminal 16 may communicate via the network 20 even when a disaster occurs in the manufacturing plant 2 and the network 18 is unable to be used.

The operator, who restores the heat treatment apparatuses 10 installed in the manufacturing plant 2, or the administrator, who instructs the operator to restore the heat treatment apparatuses 10, makes a reference request for list information of the operation status data of the heat treatment apparatuses 10 installed in the manufacturing plant 2 by operating the information processing apparatus 14 or the information processing terminal 16.

Figure 6:
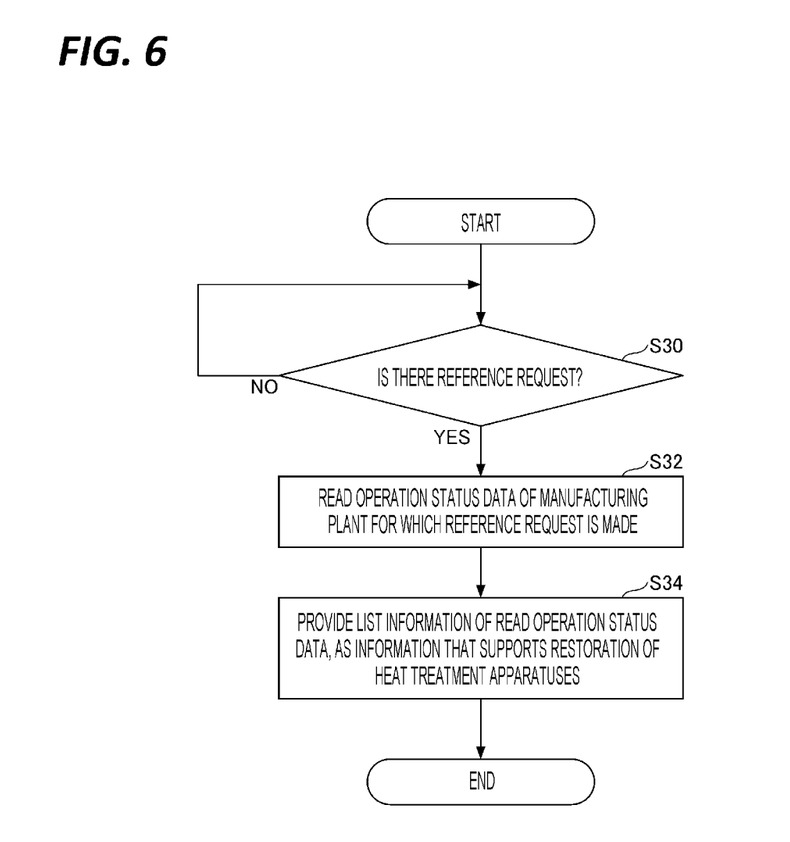
FIG. 6 is a flow chart of an example of processing of the information processing apparatus according to the present embodiment.

The information processing apparatus 14 executes processing according to the procedure illustrated in, for example, FIG. 6. FIG. 6 is a flow chart of an example of processing of the information processing apparatus according to the present embodiment.

The operation status data providing unit 56 repeats processing of step S30 until a reference request for list information of the operation status data of the heat treatment apparatuses 10 provided in the manufacturing plant 2 is accepted from the operator or the administrator. When the reference request is accepted from the operator or the administrator, the operation status data providing unit 56 performs processing of step S32.

In step S32, the operation status data providing unit 56 reads the operation status data of the plurality of heat treatment apparatuses 10 of the manufacturing plant 2 for which the reference request is made, the operation status data being illustrated in, for example, FIG. 5, from the operation status data storing unit 54. In step S34, the operation status data providing unit 56 displays and outputs the list information of the operation status data read in step S32, thereby providing the operator or the administrator with information that supports the restoration of the plurality of heat treatment apparatuses 10 of the manufacturing plant 2 for which the reference request is made.

The operator or the administrator who has referred to the operation status data list illustrated in, for example, FIG. 5 may check the recipe that was being executed by the heat treatment apparatus 10 corresponding to each record, the degree of progress of processing of the recipe, and the execution status when the operation was forcibly stopped due to the occurrence of a disaster.

The operator or the administrator may determine that the heat treatment apparatus 10 with a device name "ToolA" in FIG. 5 was executing a heat treatment when the operation was forcibly stopped, and the processing chamber is likely to be filled with gas.

For example, in order to restore the heat treatment apparatus 10 with the device name "ToolA" in FIG. 5, for example, equipment of a gas mask is necessary to cope with the possibility of gas leakage, etc. and wafers in the processing chamber are unlikely to be reusable, and thus the priority of restoration is low.

The operator or the administrator may determine that the heat treatment apparatus 10 with a device name "ToolC" in FIG. 5 was preparing a heat treatment when the operation was forcibly stopped, and the processing chamber is unlikely to be filled with gas.

For example, in order to restore the heat treatment apparatus 10 with the device name "ToolC" in FIG. 5, for example, equipment of a gas mask is unnecessary due to the low possibility of gas leakage, etc. and wafers in the processing chamber are likely to be reusable, and thus the priority of restoration is high.

In this manner, the operator or the administrator who has referred to the operation status data list illustrated in FIG. 5 may easily determine the priority of restoration of the plurality of heat treatment apparatuses 10 installed in the manufacturing plant 2, from the list information of the operation status data of FIG. 5. By following the determined priority of restoration, the operator or the administrator may perform a quick reaction. Then, it is possible to suppress damage to a minimum by shortening the time until the manufacturing plant 2 is restored and restarted.

In the processing of the flow chart of FIG. 6, the operator or the administrator determines the priority of restoration of the plurality of heat treatment apparatuses 10 installed in the manufacturing plant 2 from the operation status data list illustrated in FIG. 5. The information processing apparatus 14 may determine the priority of restoration of the plurality of heat treatment apparatuses 10 installed in the manufacturing plant 2 from the operation status data list illustrated in, for example, FIG. 5, and may provide the priority to the operator or the administrator.

Figure 7:
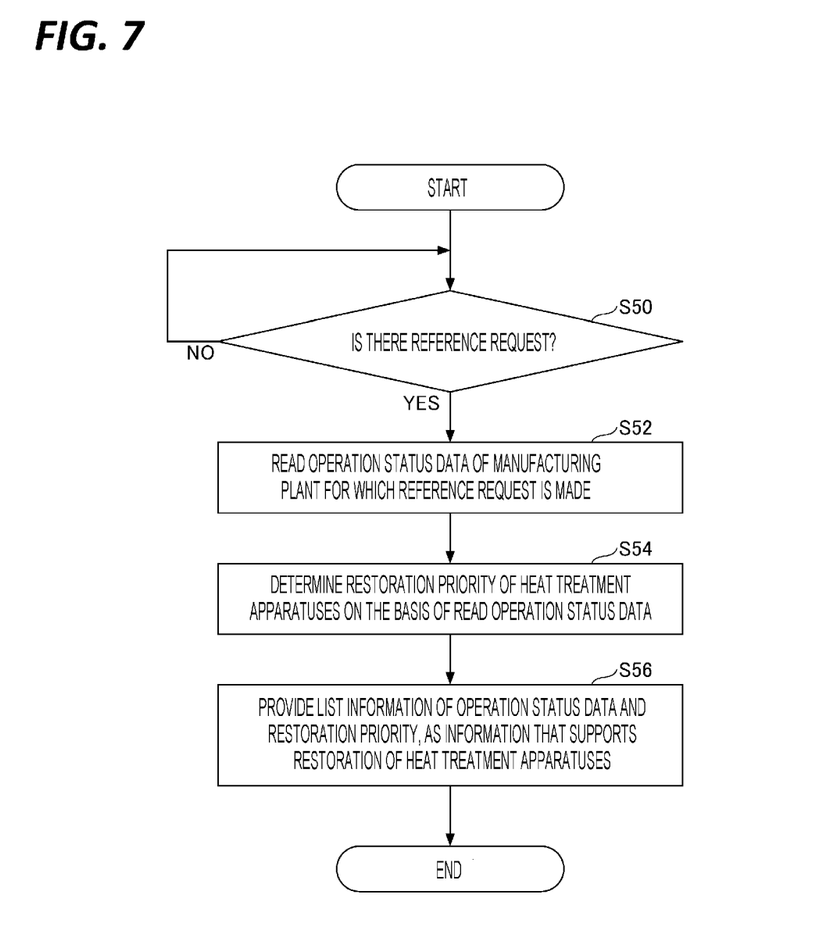
FIG. 7 is a flow chart of an example of processing of the information processing apparatus according to the present embodiment.

FIG. 7 is a flow chart of an example of processing of the information processing apparatus according to the present embodiment. The processing in steps S50 to S52 is the same as steps S30 to S32 in FIG. 6. In step S54, according to the list information of the operation status data read in step S52, the operation status data providing unit 56 determines the priority of restoration of the plurality of heat treatment apparatuses 10 of the manufacturing plant 2 for which the reference request is made, based on a preset rule table, etc.

The rule base is set in such a manner that, for example, the heat treatment apparatus 10 whose reusable wafers are likely to be collected is determined to have a high priority, and the heat treatment apparatus 10 whose reusable wafers are unlikely to be collected is determined to have a low priority. Further, the rule base is set in such a manner that, for example, the heat treatment apparatus 10 with a high possibility of gas leakage is determined to have a low priority, and the heat treatment apparatus 10 with a low possibility of gas leakage is determined to have a high priority.

In step S56, the information processing apparatus 14 displays and outputs the list information of the operation status data, and the priority of restoration of the plurality of heat treatment apparatuses 10 of the manufacturing plant 2, the priority being determined in step S54, so as to provide the operator or the administrator with information that supports the restoration of the plurality of heat treatment apparatuses 10 of the manufacturing plant 2.

According to the information processing system 1 according to the present embodiment, it is possible to provide a technique that supports the restoration of the heat treatment apparatuses 10 of the manufacturing plant 2 even in the case of an occurrence of, for example, a disaster or an accident that forcibly stops the heat treatment apparatuses 10 in the manufacturing plant 2.

According to the present disclosure, it is possible to provide a technique that supports the restoration of the heat treatment apparatuses.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. An information processing apparatus comprising:
a memory; and
a processor coupled to the memory and configured to:
collect operation status data of a plurality of heat treatment apparatuses installed in a manufacturing plant;
store the operation status data for each of the plurality of heat treatment apparatuses in the memory;
generate list information of the operation status data for each of the plurality of heat treatment apparatuses stored in the memory, as information that supports restoration of the plurality of heat treatment apparatuses when operations of the plurality of heat treatment apparatuses are forcibly stopped;
generate information indicating a priority of the restoration for each of the plurality of heat treatment apparatuses, based on the operation status data for each of the plurality of heat treatment apparatuses stored in the memory; and
restore the plurality of heat treatment apparatuses based on the information indicating the priority of the restoration for each of the plurality of heat treatment apparatuses.

2. The information processing apparatus according to claim 1, wherein the processor is configured to periodically collect information necessary for determining priority in the restoration of the plurality of heat treatment apparatuses by an operator, from the plurality of heat treatment apparatuses.

3. The information processing apparatus according to claim 2, wherein the information necessary for determining priority includes at least one of a possibility of recovering reusable substrates and a possibility of gas leakage.

4. The information processing apparatus according to claim 1, wherein the operation status data includes identification information of a recipe that is being executed by each of the plurality of heat treatment apparatuses, identification information of a step indicating a degree of progress of a processing of the recipe, and execution status information of the step.

5. The information processing apparatus according to claim 1, wherein the processor is configured to provide an operator with the list information of the operation status data that is stored in the memory immediately before the operations of the plurality of heat treatment apparatuses are forcibly stopped.

6. The information processing apparatus according to claim 1, wherein the manufacturing plant is installed in an environment where an operation is capable of being continued even when the operations of the plurality of heat treatment apparatuses are forcibly stopped.

7. A non-transitory computer-readable storage medium having stored therein a program that causes a computer to execute a process including:
collecting operation status data of a plurality of heat treatment apparatuses installed in a manufacturing plant;
storing the operation status data for each of the plurality of heat treatment apparatuses in a storage;
generating list information of the operation status data for each of the plurality of heat treatment apparatuses stored in the storing of the operation status data, as information that supports restoration of the plurality of heat treatment apparatuses when operations of the plurality of heat treatment apparatuses are forcibly stopped;
generating information indicating a priority of the restoration for each of the plurality of heat treatment apparatuses, based on the operation status data for each of the plurality of heat treatment apparatuses; and
restoring the plurality of heat treatment apparatuses based on the information indicating the priority of the restoration for each of the plurality of heat treatment apparatuses.

8. A restoration support method comprising:
providing an information processing system including a plurality of heat treatment apparatuses installed in a manufacturing plant, an information processing apparatus communicatively connected to the plurality of heat treatment apparatuses, and an information processing terminal communicatively connected to the information processing apparatus;
collecting operation status data of the plurality of heat treatment apparatuses;
storing the operation status data for each of the plurality of heat treatment apparatuses in a storage;
generating list information of the operation status data for each of the plurality of heat treatment apparatuses stored in the storing, as information that supports restoration of the plurality of heat treatment apparatuses when operations of the plurality of heat treatment apparatuses are forcibly stopped;
generating information indicating a priority of the restoration for each of the plurality of heat treatment apparatuses, based on the operation status data for each of the plurality of heat treatment apparatuses;
providing the information processing terminal with the information indicating the priority of the restoration for each of the plurality of heat treatment apparatuses; and
restoring the plurality of heat treatment apparatuses based on the information indicating the priority of the restoration for each of the plurality of heat treatment apparatuses, in accordance with an instruction from the information processing terminal.

* * * * *